March 13, 1956 — G. WIKKENHAUSER — 2,737,815
GYROSCOPIC APPARATUS
Filed Dec. 15, 1952 — 2 Sheets-Sheet 1

G. WIKKENHAUSER
Inventor

By Morno & Hall
Attorneys

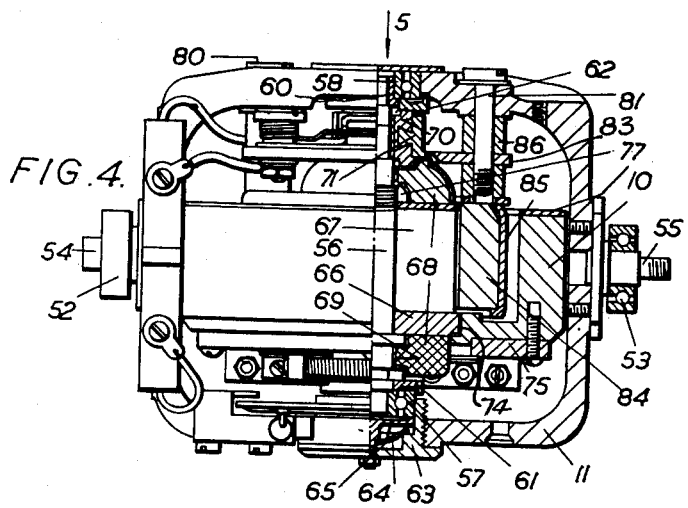
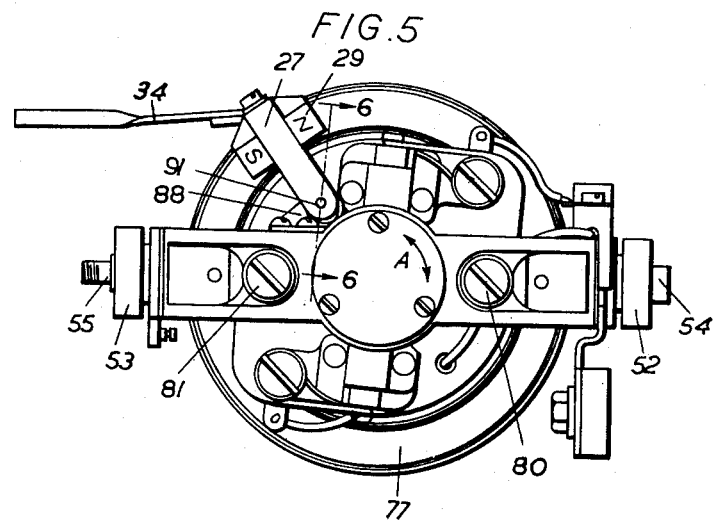
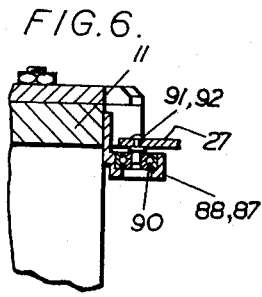

2,737,815

GYROSCOPIC APPARATUS

Gustav Wikkenhauser, Barkingside, England, assignor to Kelvin & Hughes Limited, Glasgow, Scotland Application December 15, 1952, Serial No. 325,970

10 Claims. (Cl. 74—5.7)

This invention relates to gyroscopic apparatus, and more particularly but not solely, to gyroscopic aircraft instruments such as artificial horizons, rate of turn, or turn and slip indicators.

Such instruments commonly have a zero or normal indication which indicates that a steady course is being followed. However, such a zero indication may also result if the rotor of the gyroscope stops rotating, and the instrument would not then show if the aircraft were deviating from course.

It has been proposed to provide means to give a warning when the speed of the rotor of such gyroscopic apparatus is below a pre-determined minimum, and one object of the present invention is the provision of gyroscopic apparatus having improved means for this purpose.

According to the present invention the apparatus comprises a gimbal ring, a rotor mounted for rotation with respect to said ring about an axis, an eddy current member attached to said rotor and symmetrical about said axis, a member pivotally mounted about an axis, a permanently magnetised body carried by said pivotally mounted member and situated adjacent to said eddy current member so that a torque is applied to the pivotally mounted member depending upon the angular velocity of the rotor about the axis, means restraining the pivotally mounted member to a first or second position according as to whether the torque thereon corresponds to an angular velocity of the rotor having more or less than a pre-determined value and an indicator actuated by said pivotally mounted member to indicate when the rotor angular velocity attains or exceeds said pre-determined value.

The pivotally mounted member is mounted preferably about an axis parallel to the axis of rotation of the rotor and may take the form of a stirrup carrying an arm which actuates a pivoted flag constituting the indicator which indicates when the rotor angular velocity attains a certain pre-determined value. This pivoted flag may be urged by a spring towards the normal or "on" position.

The permanent magnet mounted on the stirrup member may have one pole adjacent a pole of opposite sense of a permanent magnet carried by the gimbal ring. In the case of electrically driven instruments this magnet may be part of the field magnet of the motor driving the instrument.

When the rotor is rotated normally the torque produced by the interaction of the permanent magnet carried by the stirrup member and the eddy current member attached to the gyroscope rotor lifts the stirrup thereby permitting the indicator to be moved by the spring to he normal or "on" position.

When the rotor slows down or stops, the interaction of the permanent magnet mounted on the stirrup member and that mounted on the gimbal ring urges the stirrup member in the opposite direction thereby causing the indicator flag to be moved by compression of the spring to the "off" position.

The rapid decrease of the force between the two magnets as the distance between them increases ensures that that flag is definitely in either the "on" or "off" position and cannot assume intermediate ambiguous positions.

These and further features of the invention will be readily understood from the following description and accompanying drawings of an electrically driven turn and slip indicator for aircraft embodying it, in which like numerals refer to like parts throughout and wherein.

Figure 4 is a view partly in top plan and partly in section of the instrument, the casing being removed;

Figure 5 is a view of the parts shown in Figure 4 looking in the direction of the arrow 5 on Figure 4; and Figure 6 is a part sectional view on the line 6—6 on Figure 5.

Figure 1:
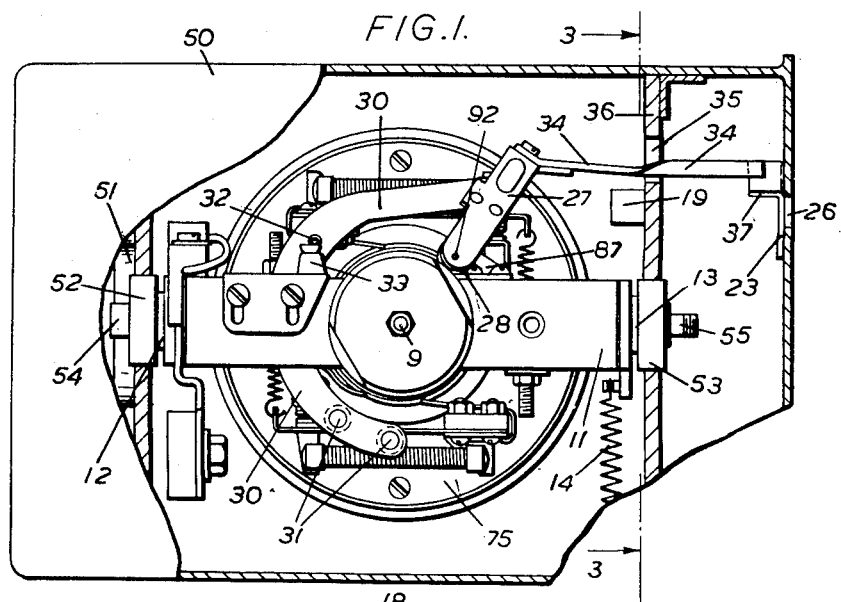
Figure 1 is an elevational view of one side of the instrument.

The turn and slip indicator disclosed herein comprises a turn indicator in the form of an electrically driven gyroscope, and a slip indicator consisting of a ball and tube arrangement.

The apparatus comprises a casing 50 carrying the indicator plate 18, spaced supporting plates 51, 36 carrying ball bearings 52, 53, in which spindles 54, 55 are mounted which carry a gimbal ring 11. A rotor spindle 56, carrying a gyroscope rotor 10 and having an axis 9, is mounted at its ends in ball bearings 57, 58, carried by the gimbal ring, a locating bush 60 being mounted in the bearing 58; 61, 62 are dust caps. An end cap 63 screws into the gimbal and supports the bearing 57 and carries a spring 64 which applies resilient end load through a disc 65 on to the bearings 57 to take up any slack in the bearings 57, 58.

The instrument is so mounted that in straight flight the spinning axis 9 of the gyro rotor 10 lies in a substantially horizontal plane, as, therefore, does the gimbal ring 11. Any deviation from straight flight, however, results in precession of the gyro wheel against the restraint of a rate spring 14, and a turn pointer 15, coupled by suitable gearing to the gimbal pivot 13, indicates the rate of turn on a scale 17 on the indicating plate 18 of the instrument. A stop member 19 serves to define the precession limit position of the gimbal 11. As the aircraft ceases to turn, the gyro precessing force decreases and the gimbal ring and turn pointer return to a centre zero indication. Means are provided to damp oscillation of the gimbal ring about the precession axis, but as these form no part of the present invention they are not shown in the drawings and will not be further referred to.

The spindle 56 also carries a sleeve (not shown) having a flange 66 at one end thereof. The sleeve carries the armature laminations of the rotor-driving motor indicated and 67 and the armature winding 68, insulating tape 69 being provided where required. The spindle also carries an insulator ring 70 for the motor commutator 71.

The outer periphery of the flange 66 is threaded at 74 to receive the rotor 10 which is internally threaded and also carries on one side a plate 75 on which the usual speed governor elements are mounted. On the other side of the rotor a thin copper ring 77 is fixed thereto forming the eddy current member referred to earlier.

The gimbal ring carries a pair of bolts 80, 81 which carry the commutator brush supporting plates 83, a two-pole permanent magnet 84 (providing the motor field) and a magnetic shield 85, suitable spacing sleeves 86 being provided where required. The field magnet is disposed with its north pole nearest to the indicator plate 18.

Mounted upon the rear face of plate 18 by a pivot 22 is a flag mechanism 23. This mechanism comprises a surface having the word "off" confined to the upper half thereof and presenting a plain surface on the lower half thereof. The flag 23 is coupled to pivot 22 by lever 24, and this arm is normally held in an upward position by spring means 25 so that only the bottom portion of flag 23 can be seen through an aperture 26, defined in the indicating plate 18. Thus, in the absence of other actuating means, the word "off" does not appear through aperture 26, and the gyro mechanism would ostensibly be operating. Stops 97, 98 limit the amount of movement of the lever 24 and thus also of the flag.

The gimbal ring has a pair of brackets 87, 88 on opposite sides of the rotor which carry ball bearings 90 (Figure 6) in which pins 91, 92 are disposed whereby the ends of a stirrup 27 are pivotally mounted on the gimbal 11. The stirrup is substantially U-shape and extends over the rotor and is inclined towards the north pole of the field magnet and makes an angle (A in Figure 5) of between 35 and 55 (e. g. 45) degrees with the plane containing the rotor axis and said pole. The base portion of the U-shaped stirrup is parallel to the peripheral face of rotor 10, and a permanent horseshoe magnet 29 is affixed to one side of said base portion near one of the legs of the U-shaped member and adjacent the copper ring 77. The magnet 29 is located with its south pole adjacent the north pole of the field magnet. An arcuate mass balancing arm 30 is fastened at one end to the opposite leg of the stirrup, extends in the direction away from the flag, curves around the rotor axis and carries small weights 31 thereon to effect a balance of the stirrup (and stirrup rod, to be described) about the pivot pins 91, 92. The balancing arm 30 also carries a small pin 32 thereon, which pin may bear upon a stop 33 affixed to gimbal ring 11 to define a rear limit position of the stirrup.

Figure 2:
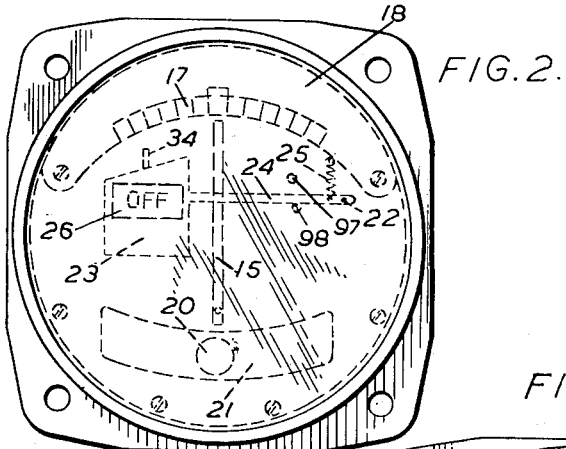
Figure 2 is a front view of the instrument showing the indicating plate of the instrument, the turn indicator, the slip indicator and the flag structure.
Figure 3:
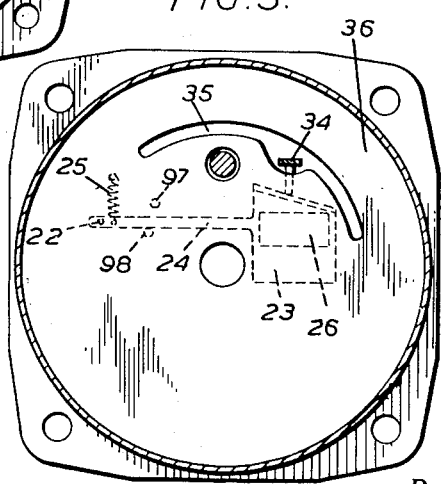
Figure 3 is a sectional view through section 3—3 of Figure 1.

A flag actuating arm or stirrup rod 34 formed from flat material is also affixed to the base portion of the stirrup, somewhat removed from magnet 29, the rod 34 extending towards the flag through an arcuate aperture 35 in a plate 36, parallel to the indicating plate 18. The rod 34 is twisted through 90° about its axis near its mid-point and its free extremity bears upon a projection 37 integrally formed in the upper edge of flag surface 23 which edge in front view (i. e., as seen in Figure 2), is inclined to the horizontal to avoid frictional jamming.

When the rotor is spinning normally there will be a magnetic interaction, or drag effect created by eddy currents, between stirrup magnet 29 and the peripheral edge of the rotor adjacent said magnet 29 and the copper strip 77. This interaction will tend to draw the magnet 29 in the direction of rotation of rotor 10, will cause the stirrup to move rearwardly to an extent limited only by the stop 33, and will thereby tend to lift stirrup arm 34 away from projection 37 and flag 23. The flag 23 will thus be urged by spring 25 into its upward position, and the "off" indication will be masked by plate 18.

When the rotor is not spinning at effective speed, the south pole of the magnet 29 will be pulled down by the north pole of the field magnet in a direction opposite that of normal rotor rotation, the arm 34 will impinge upon the projection 37, and the flag 23 will be moved to its "off" position. It will be appreciated that, because of the rapid decrease in the force between the south pole of the magnet 29 and the north pole of the field magnet as the stirrup moves rearward, the stirrup will always be in either the "on" or "off" position and cannot assume intermediate ambiguous positions.

The arm 34 passes through an arcuate aperture 35 in plate 36, the shape of aperture 35 permitting the rod 34 to move freely as the gyro precesses. Inasmuch as gyro precession only occurs when the rotor is spinning, the aperture need only be sufficiently deep to permit the arcuate movement of rod 34 in off-centre position. The aperture 35 is made somewhat deeper at that portion thereof corresponding to centre position in order to permit up and down movement of rod 34 in the event the zero gimbal position is due to a stationary rotor rather than straight flight of the aircraft. The gimbal ring is of course then centralised by the spring 14.

The mounting of the magnet 29 as described provides a means of urging the flag to its "off" position under a force which increases as the speed of the rotor falls and its mounting by means of a stirrup at the angle described brings the magnet 29 near to the north pole of the field magnet. This angular disposition and the mounting of the field magnet with its north end towards the flag avoids making the arm 34 of undue length on the one hand and avoids too much out of balance of the weight of the magnet acting about the pivots of the stirrup member. When the arm 34 is in its "up" position (i. e. "rotor operative" position) it is completely out of contact with the flag and the plate so that it produces no frictional restraint opposing precession of the gyroscope.

It will be seen that when the instrument is mounted in a normal position in an aircraft, i. e. with the indicator plate 18 facing the rear of the aircraft, the direction of spin of the rotor is such that the direction of precession of the gimbal in a correctly banked turn is opposite to the direction of bank of the aircraft. The governed speed of the rotor and the rate of the spring 14 are so chosen that at the normal calibration speed (usually some 240 knots) and in a "Rate 1" turn (i. e. a turn at 180°/minute) the angle through which the gimbal ring precesses is exactly half of the angle of bank of the aircraft. This implies that the instrument will give the same reading whether mounted in an aircraft or upon a level testing table and submitted to a turn at that rate (as the angle between gimbal ring and vertical will be the same in both cases) and it also implies that when the aircraft is making a landing approach (at a speed about half that of the calibration speed, or some 120 knots) the gimbal will be substantially level in space when executing a rate 1 turn. Thus the instrument will then, as is most desirable, be in its most accurate condition.

The direction of apparent gravity is of course dependent upon the rate of turn and speed of the aircraft. In the present form of slip indicator, a ball 20 is mounted in a glass tube 21 located within a recess in the indicating plate 18. During a correctly banked turn, the ball 20 is maintained at its centre or zero position, and any departure from the correct bank angle is indicated by an appropriate movement of the ball from its centre position.

While the above description has been confined to a turn and slip indicator embodying the invention it will be readily appreciated that the invention is equally applicable to other forms of gyroscopic apparatus.

I claim:

1. A gyroscope apparatus comprising a gimbal ring, a gyroscope rotor pivotally mounted in the said gimbal ring, an armature attached to the rotor, a motor field magnet carried by the gimbal ring and located within the rotor, a stirrup member pivotally mounted on said gimbal ring and extending over the rotor, a thin copper ring attached to one side of the said rotor, a permanent magnet mounted on said stirrup member at the side of the rotor adjacent the copper ring and having one pole thereof adjacent the pole of opposite sense of the field magnet, an actuating arm mounted on said stirrup member, an indicator device operated by said arm to indicate when the rotor fails to rotate at effective speed, and means for mass balancing the stirrup member and actuating arm about the rotor axis.

2. A gyroscope apparatus comprising a gimbal ring, a gyroscope rotor pivotally mounted in the gimbal ring, an armature attached to the rotor, a motor field magnet carried by the gimbal ring and located within the rotor, a stirrup member pivotally mounted on said gimbal ring and extending over the rotor, a permanent magnet mounted on said stirrup member adjacent said rotor and having one pole thereof adjacent the pole of opposite sense of the field magnet, an actuating arm mounted on said stirrup member, an indicator device operated by said arm to indicate when the rotor fails to rotate at effective speed, and means for mass balancing the stirrup member and actuating arm about the rotor axis, said actuating arm being completely disengaged from the indicator device during effective operation of the rotor.

3. A gyroscope apparatus comprising a gimbal ring, a gyroscope rotor pivotally mounted in the gimbal ring, an armature attached to the rotor, a motor field magnet carried by the gimbal ring and located within the rotor, a stirrup member pivotally mounted on said gimbal ring and extending over the rotor, a permanent magnet mounted on said stirrup member adjacent said rotor and having one pole thereof adjacent the pole of opposite sense of the field magnet, an actuating arm mounted on said stirrup member, an indicator device operated by said arm to indicate when the rotor fails to rotate at effective speed, said indicator device comprising a flag, a lever carrying the flag, stops to limit the motion of the lever, a spring to move the lever to "rotor operative" position, said lever being moved to the "rotor inoperative" position by said actuating arm, and means for mass balancing the stirrup member and actuating arm about the rotor axis.

4. Gyroscopic apparatus as claimed in claim 3 wherein the permanent magnet is a horseshoe magnet.

5. In a gyroscope apparatus, a gyroscope rotor pivotally mounted in a gimbal ring, and an actuating device comprising a U-shaped member having the legs thereof pivotally attached to said gimbal ring and the base thereof substantially parallel to the peripheral face of said rotor, a permanent magnet affixed to said U-shaped member adjacent a lateral edge of said rotor whereby the spinning of said rotor will tend to set up forces with said permanent magnet causing said U-shaped member to pivot in the direction of spinning of said rotor, a fixed bias magnet adjacent said permanent magnet causing said U-shaped member to assume a predetermined position when said rotor is not spinning, a cantilever actuating arm affixed to the base of said U-shaped member, and an indicating device adjacent the free end of said actuating arm and responsive to the position thereof.

6. The apparatus of claim 5 including a mass balancing arm affixed to one leg of said U-shaped member.

7. The apparatus of claim 5 in which said indicating device comprises an indicating plate having an aperture therein, a flag structure pivotally mounted on said indicating plate and having spring bias means urging said flag toward a predetermined position with respect to said aperture, said flag including a substantially orthogonal projection adjacent the free end of said actuating arm whereby said arm may move said flag against said spring bias.

8. The apparatus of claim 5 wherein said rotor includes a cylindrical cavity coaxial with said rotor axis, said fixed bias magnet being disposed within said cylindrical cavity and being fixedly attached to said gimbal ring.

9. The apparatus of claim 5 including a first plate adjacent said rotor and defining an arcuate aperture therein, said arcuate aperture being deeper in one portion than in the remainder thereof, a second plate substantially parallel to said first plate and including a spring biased flag device pivotally mounted thereon, said actuating arm extending from said U-shaped member through said arcuate aperture and selectively bearing upon said flag device to move said flag device against its spring bias.

10. A gyroscope apparatus comprising a gimbal ring, a gyroscope rotor pivotally carried by the gimbal ring, ball bearings carried by the gimbal ring on opposite sides of said rotor, a stirrup member having its ends pivotally mounted in said ball bearings, a copper ring attached to one side of the rotor, a permanent magnet mounted on said stirrup member adjacent the copper ring, an armature attached to the rotor, a motor field magnet carried by the gimbal ring and located within the rotor, an indicator flag located to one side of the rotor, said field magnet having one pole disposed towards said flag, said stirrup member being inclined towards said flag, said permanent magnet having one pole adjacent said pole of the field magnet, an actuating arm carried at one end on the stirrup member and extending towards and over said flag and adapted to depress it when the rotor speed falls to an inoperative degree, a spring to return the flag to the operative position, and a balancing arm for mass balancing the stirrup member and actuating arm said balancing arm being attached at one end to the stirrup member and extending away from the flag and around the rotor axis.

References Cited in the file of this patent

UNITED STATES PATENTS

| | | |
|---|---|---|
| 2,292,090 | Reichel | Aug. 4, 1942 |
| 2,364,810 | Noxon | Dec. 12, 1944 |
| 2,589,873 | Seifried | Mar. 18, 1952 |